Figure 1:
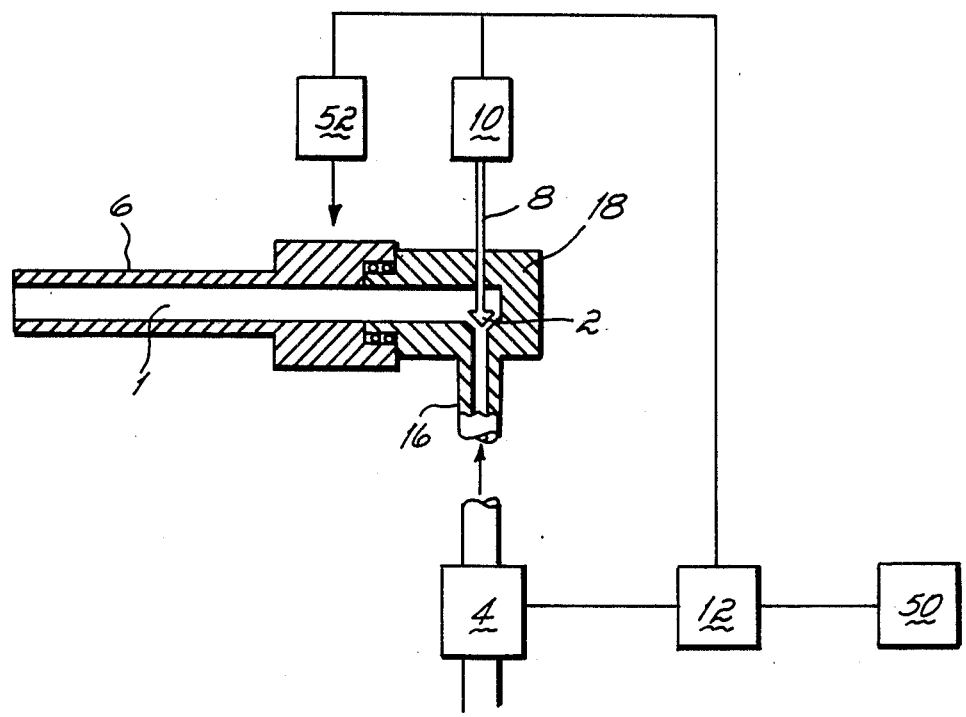

United States Patent [19]

Meinen

[11] Patent Number: 4,648,154
[45] Date of Patent: Mar. 10, 1987

[54] PORTIONING DEVICE

[76] Inventor: Georg H. Meinen, Meicastrasse 4, 2905 Edewecht (Oldb.), Fed. Rep. of Germany

[21] Appl. No.: 662,882

[22] Filed: Oct. 19, 1984

[30] Foreign Application Priority Data

Oct. 28, 1983 [DE] Fed. Rep. of Germany ....... 3339274

[51] Int. Cl.⁴ ............................................ A22C 11/06
[52] U.S. Cl. ............................................ 17/35; 17/33; 17/49; 141/94; 141/95; 141/114; 141/DIG. 1; 222/14
[58] Field of Search .................. 17/33, 35, 41, 49; 73/861.11; 141/94, 95, 114, 192, DIG. 1; 222/14, 55

[56] References Cited

U.S. PATENT DOCUMENTS

| | | |
|---|---|---|
| 577,494 | 2/1897 | Schoenland .................. 17/41 X |
| 3,731,346 | 5/1973 | Kupcikevicius .................. 17/49 |
| 3,824,456 | 7/1974 | Wiegand .................. 73/861.11 |
| 4,187,583 | 2/1980 | Townsend et al. .................. 17/49 |
| 4,370,779 | 2/1983 | Meier .................. 17/49 |
| 4,451,954 | 6/1984 | Müller et al. .................. 17/33 X |

FOREIGN PATENT DOCUMENTS 797879 7/1958 United Kingdom .................. 17/33
410816 5/1974 U.S.S.R. .................. 17/35

Primary Examiner—E. R. Kazenske
Assistant Examiner—Michael D. Folkerto
Attorney, Agent, or Firm—Wood, Herron & Evans

[57] ABSTRACT

A machine for consecutively metering individual quantity portions of a stuffing substance such as sausage meat. The machine includes a nozzle through which the substance is stuffed into a casing, and feeding apparatus for feeding the substance under presssure into the nozzle. The machne also includes cut off apparatus operable to divide the substance into individual quantity portions. In preferred form, recirculation apparatus is provided to permit continuous recirculation of the stuffing therethrough when no substance is being fed into the nozzle, recirculation of the stuffing being prevented when it is being fed into the nozzle. Also, and in preferred form, a metering device, that preferably includes a magnetic/inductive flow meter capable of making velocity or flow measurements, and capable of determining stuffing quantity form those measurements, is connected with the cut off apparatus for metering the stuffing to be provided in each individual quantity portion. This metering device is located upstream of the cut off apparatus.

6 Claims, 4 Drawing Figures

PORTIONING DEVICE

DESCRIPTION

The invention concerns a device for portioning pasty stuffing substances, specifically sausage meat held under stuffing pressure by a stuffing pressure supply and divided by a closing and/or twisting device in individual portions of possibly constant quantity, under control by a quantity measuring instrument.

A device of that type is previously known, e.g., from the German patent disclosure 3018793. With this prior portioning device, a quantity measuring instrument is arranged on and/or before the stuffing pressure supply, namely a stuffing cylinder, and provides a control signal which is proportional to the cylinder stroke and/or the transported stuffing substance. This signal controls on the prior device and thereafter the twisting device.

The prior device has the disadvantage that the transported quantity of stuffing substance can be measured only indirectly, which in case of changes of the stuffing substance condition may lead to measuring inaccuracies and thus to unequal portions. Thus, the prior device does not measure the actually transported stuffing substance quantity, but only its set value.

The problem underlying the invention is therefore to provide a portioning device capable of measuring with simple means, continuously and in non-contact fashion, the actually transported stuffing substance quantity and controlling on the basis of this measurement the portioning organs, for instance a closing device and/or a twisting device.

This problem is inventionally solved in that the quantity meter is a quantity measuring instrument which is arranged in the path of the stuffing substance behind the stuffing pressure supply and continuously measures the transported stuffing substance quantity.

The quantity measuring instrument is favorably a magnetic/inductive flowmeter which is arranged in the path of the stuffing substance between stuffing pressure supply and closing device.

Of particular advantage is arranging the closing device in the path of the stuffing substance at the end of its path through the portioning device.

This will ensure that the full stuffing pressure will be maintained also at the end of a portioning operation, for instance of a string of sausages, along the entire stuffing substance path up to the end of the discharge nozZle so that the beginning of stuffing or portioning a new sausage string exactly the stuffing substance quantity as controlled by the quantity measuring instrument will be fed already from the outset.

Controlled by the signal from the quantity measuring instrument, the portioning of the stuffing substance may be performed through periodic opening and closing of the closing device. Similarly, also the twisting device may be controlled by the quantity measuring instrument so that upon reaching a desired portion it will begin twisting the sausage casing, thereby portioning the sausage meat. In this case, the closing organ may be actuated either automatically as well as at the beginning or end of a sausage link string, through the controller connected with the quantity meter, or by hand before the portioning operation is started, and/or can be closed by hand at the end of a sausage link string.

When the closing device is arranged at the end of the stuffing substance path it can be favorably realized by a valve plate which is attached to a valve rod running inside the discharge nozzle. The valve rod can favorably be operated through a device situated outside or behind the nozzle. If the nozzle is provided with one of the customary twisting devices, the valve rod is favorably mounted in an easily rotatable fashion on the actuating device.

The closing device many favorably be a reversing slide which is arranged in the path of the stuffing substance between the quantity measuring instrument and the discharge nozzle. A return line is in this case provided which, originating at the reversing slide, extends to the stuffing substance path before the stuffing pressure supply and to the quantity measuring instrument, connecting them with one another. This has the particular advantage that, in closing the closing organ, it is not necessary to shut the stuffing pressure supply off or that it works against a closed feed system, but that at the instant of closing and/or reversing the stuffing substance an idling circulation of the stuffing substance is set in motion. Additionally, this offers advantages regarding the measuring accuracy of the quantity measuring instrument, which may show inaccuracies in the startup and stopping phase. When reopening the closing device, that is, changing the reversing slide over, the measuring and/or counting value of the quantity measuring instrument and/or control is favorably reset or started at a suitable moment.

The invention will be more fully explained hereafter with the aid of embodiments and under reference to the figures.

Figure 2:
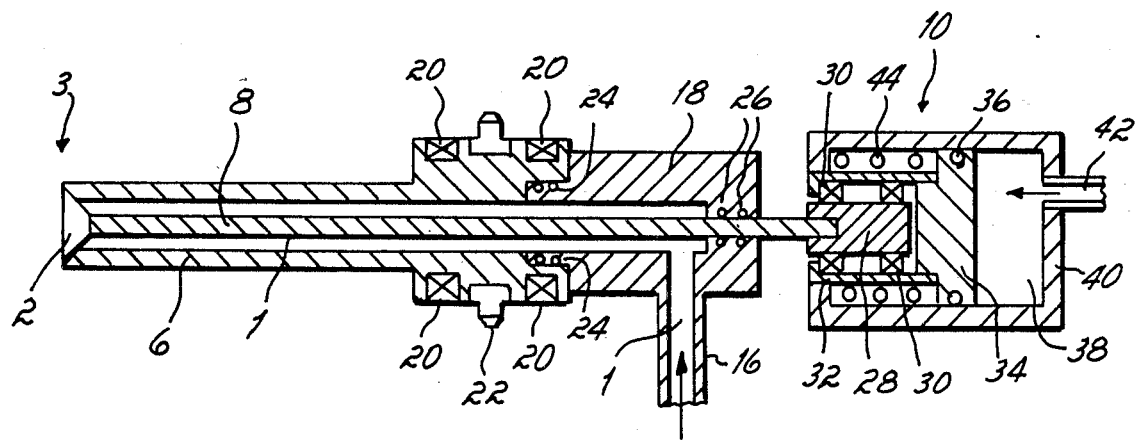
Figure 3:
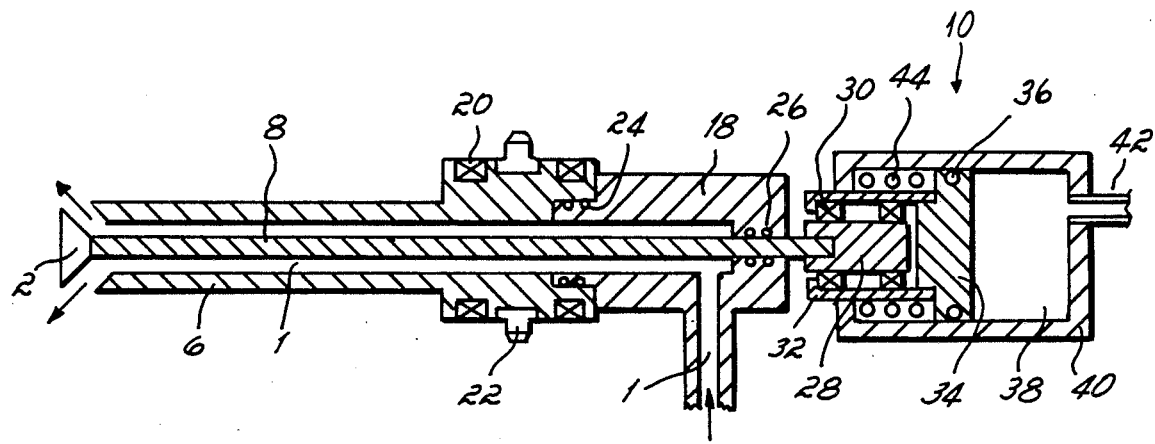

FIG. 1 shows a simplified illustration of an inventional portioning device;

FIG. 2, another embodiment of the inventional portioning device in locked position;

FIG. 3, the portioning device relative to FIG. 2 in pass-through position, and

Figure 4:
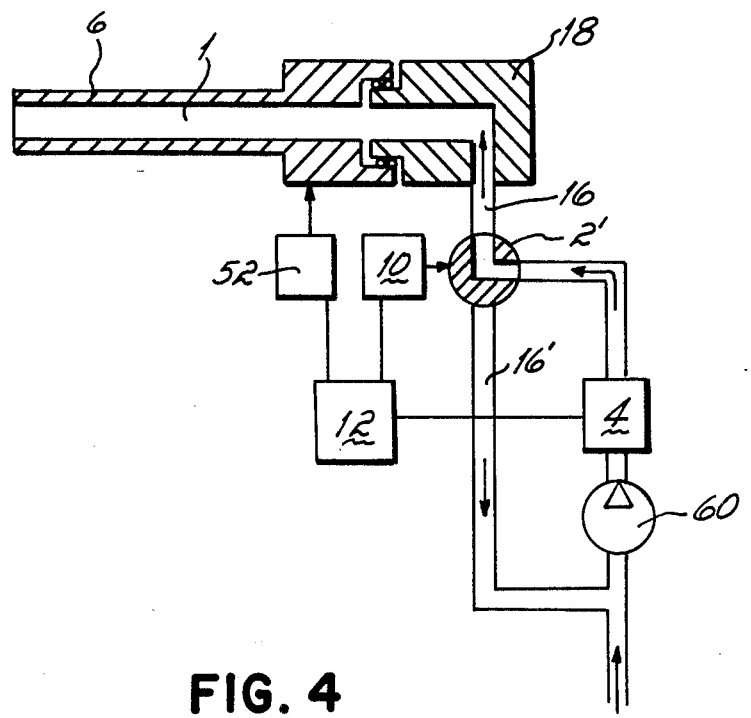

FIG. 4, another embodiment of the inventional portioning device.

FIG. 1 illustrates a portioning device provided with a twisting device. The portioning device comprises a nozzle 6 through the hollow space of which extends the stuffing substance path 1 from the feed 16 to the nozzle point. The nozzle with the stuffing substance path 1 is divided in the front part 6 which with the aid of suitable (not illustrated) bearings is mounted rotatably in supports, and the rear component 18 which is mounted in stationary fashion and comprises the supports for the rotatable part 6. In the stationary nozzle part, at the end of the feed path 16, there is a valve seat provided for engagement of a valve plate 2 serving to establish a pressure-tight closing of the feed path. The valve path 2 is mounted on a valve rod 8 which in a sliding seal fashion is mounted in the stationary path 18 and can be actuated through an actuator 10 controlled by a yet to be described control device.

To twist the sausage ends, the front part of the nozzle is provided, e.g., with a ring gear (not illustrated in FIG. 1) which can be operated by a suitable drive (not illustrated) and a control 52.

Illustrated in FIG. 2 is a favorable embodiment of the invention where the closing device 2 is arranged on the end of the nozzle point 3. On this embodiment, the valve rod 8 extends across the length of the hollow space of the nozzle and connects on the side of the nozzle point 3 permanently with a valve plate which in closed condition is in contact with suitable faces of the nozzle point 3. The other end of the valve rod 8 is mounted and runs in the other end of the nozzle and is sealed with the aid of seals 26. For twisting the sausage ends, the front part of the nozzle is provided with a ring gear 22 which can be operated by a gear drive—not illustrated in FIG. 2—so as to twist the stuffed sausage at the proper moment. The front end of the nozzle is sealed in sliding fashion, by seals 24, against the other nozzle part 18 which is mounted in a stationary manner on the portioning device and into which empties the feed line 16.

On its end opposite the nozzle point, the valve rod 8 is permanently connected with an end component 28 which features roller bearings 30 which enable a rotary movement of the valve rod. This is necessary in order for the valve rod to turn freely in the twisting process, making it unnecessary for the valve plate 2 to slide on its contact faces on the nozzle tip 3. The roller bearings 30 bear within the nozzle 32 which is arranged in the cylinder housing 40 in slidable fashion.

Mounted slidably in the cylinder housing 40 is a piston plate 34 which is in contact with the sleeve 32 and, pressure-tight through seals 36, with the piston housing 40. A compression spring 44 is provided between the piston plate 34 and the cylinder housing 40 on the nozzle side.

When pressure fluid or pressure gas is admitted to the feed line 42 to the interior of the piston housing 38, controlled by the yet to be described control device, the piston plate 34 shifts left toward the nozzle, in FIG. 2, since it bears on the piston housing 40, pressure-tight with the aid of seals 36. The left shift is transmitted to the sleeve 32 which is arranged shiftably in the housing 40, and is transmitted from the sleeve via the bearings 30 to the end component 28 and the valve rod 8. This causes the valve plate 2 to lift off the nozzle end 3 and release the nozzle discharge opening as long as the pressure equilibrium prevails between the gas and/or fluid pressure in the space 38 and the counterforce of the spring 44. Pressurized, the stuffing substance can during this time discharge from the feed space 1 and, e.g., eject into a sausage. This position of the portioning device is shown in FIG. 3.

When a sufficient stuffing substance quantity has passed the nozzle, the control turns the pressure gas or pressure fluid supply to the feed line 42 off again, depressurizing the cylinder space 38. The force of the spring 44 causes the piston plate 34 and with it the sleeve 32, and component 28, and the valve rod 8 to retract in the position illustrated in FIG. 2. The valve plate 2 bears then again on the end of the nozzle, sealing it pressure-tight and permitting no stuffing substance to discharge. At this moment, the control device actuates the twisting device by means of the ring gear 22 so that the stuffed sausage will be twisted and sealed.

As soon as the twisting process is completed, the feed line 42 is again pressurized causing the stuffing substance valve 2,8,10 to open again and permitting completion of another stuffing process.

The valve remains closed at the end of a sausage link string, permitting no further stuffing substance to discharge from the end of the nozzle and ensuring that the pressure in the interior of the nozzle and the entire stuffing substance feed will be maintained.

Similarly, however, the stuffing substance valve 2,8,10 relative to FIGS. 1 through 3 may be operated only at the beginning and end of stuffing a sausage link string and portioning the individual sausages only through actuation of the twisting device, without previously closing the stuffing substance valve 2,8,10.

This actuation of the stuffing substance valve at the beginning and end of a sausage link string may be handled either manually or by the control device 12.

As already mentioned initially, the quantity measuring instrument is especially favorably designed as a magnetic/inductive flowmeter 4. Surprisingly, such magnetic/inductive flowmeters are suited also for metering inhomogeneous substance types such as sausage meat and similar.

This flowmeter utilizes the fact that the sausage meat has a sufficient minimum conductivity, that the movement of the substance through the measuring instrument causes through the externally applied magnetic field a magnetic induction which perpendicular to the flow direction and to the applied magnetic field generates a voltage which is proportional to the flow velocity of the conductive substance within the measuring instrument. Through suitable calibration it is possible to directly determine the velocity and, at known cross section of the measuring instrument, also the quantitative feed. The control device 12 to which the velocity signal is transmitted generates the travel integral and thus the volume integral over time. As soon as a volume preset with the aid of an adjustment device 50 has passed the quantity measuring instrument 4, the control device sends a suitable signal to a valve arranged in the pressure feed line 42, causing the valve to close and simultaneously depressurize the piston space 38 so that the sausage meat valve 2 will close.

A suitable time span thereafter, the control device 12 activates the motor 52 which through the intermediary of a gear puts the twisting device in motion, thus twisting the sausage. Following the twisting process, the control device 12 again opens the valve (not shown) in line 42 permitting the pressure generated by a hydraulic motor to act again on the piston plate 34, thereby opening the valve 2 and permitting new stuffing substance to enter the next sausage.

When starting the positioning device, the valve (not shown) in line 42 is kept open until the first stuffing substance discharges from the nozzle tip 3. Next, the valve 2 is closed and stuffing substance continues to be fed along path 1, with the valve closed, until the necessary stuffing pressure has built up. Once the necessary stuffing pressure has been reached, the portioning device is started and a constant stuffing pressure is maintained in the entire line during the entire stuffing and portioning cycle. This enables a very accurate portioning in contingence on the stuffing substance flowing through the measuring instrument and/or through its velocity.

On the especially favorable embodiment relative to FIG. 4, the nozzle and twisting device have the same design and are controlled in the same fashion as in the preceding examples although the closing device is different.

The closing device is in this embodiment a reversing slide 2' arranged in the path 16 of the stuffing substance between the discharge nozzle 6 and the quantity measuring device 4. For purposes of closing the stuffing substance path 16 to the nozzle 6 the reversing slide 2', which during the stuffing process ensures an unobstructed connection between nozzle and quantity measuring instrument, is repositioned so as to reroute the stuffing substance path from the measuring instrument 4 to a return line 16' which returns the stuffing substance to its path before the stuffing pressure supply 60.

The advantage of the this arrangement is that a steady feeding of stuffing substance via the stuffing pressure supply 60, quantity measuring device 4, reversing slide 2', and return line 16' can be maintained even though the stuffing substance feeding to the nozzle is blocked. Therefore, the stuffing pressure supply 60 need not be shut off. The considerable advantage of this arrangement is that measuring inaccuracies in the quantity measuring device 4 cannot occur during an otherwise necessary startup and/or stopping phase, since a continuous and unchanging stuffing substance circulation is maintained.

At the moment the twisting process is completed, the reversing slide 2' returns again to the position shown in FIG. 4 while at the same time the count and/or measured value of the quantity measuring instrument is reset or restarted at a suitable moment in the control device 12 so that a new sausage portion can be measured off.

The reversing valve 2' remains at the end of the sausage link string in its retracted position permitting the maintenance of a continuous sausage meat circulation. As a result, a constant pressure is maintained in the entire stuffing substance path up to the reversing valve 2', which pressure will not drop because the stuffing pressure supply need not be shut off.

I claim:

1. A machine for consecutively metering individual quantity portions of a stuffing substance such as sausage meat, said machine comprising
   a nozzle through which said substance is stuffed into a casing,
   feeding apparatus connected with said nozzle for feeding said substance under a stuffing pressure into said nozzle,
   cut off apparatus connected with said feeding apparatus, said cut off apparatus being operable to divide said substance into individual quantity portions,
   recirculation apparatus connected with said feeding apparatus, said recirculation apparatus permitting continuous recirculation of said substance therethrough at the stuffing pressure when no substance is being fed into said nozzle, and said recirculation apparatus preventing recirculation of said substance therethrough when said substance is being fed into said nozzle, and
   a magnetic/inductive flowmeter device connected with said cut off apparatus for metering the amount of said substance to be provided in each individual quantity portion through said nozzle, said flowmeter device causing operation of said cut off apparatus when said quantity portion has been achieved as sensed by said flowmeter device, and said flowmeter device being located upstream of said cut off apparatus within said recirculation apparatus so as to continuously sense the quantity of said substance being fed into said nozzle during stuffing of a casing by use of said machine.

2. A machine as set forth in claim 1, said flowmeter device functioning to measure the velocity of said substance as it passes through said flowmeter device, said machine comprising
   a control device connected with said flowmeter device, said control device being adapted to generate a control signal from the velocity signal that corresponds with the travel integral, said control signal functioning to activate said cut off apparatus.

3. A machine as set forth in claim 1, said cut off apparatus comprising
   a reversing valve.

4. A machine for consecutively metering individual quantity portions of a stuffing substance such as sausage meat, said machine comprising
   a nozzle through which said substance is stuffed into a casing;
   a feeding tube connected at a first feed tube end with said nozzle for feeding said substance under a stuffing pressure into said nozzle;
   a recirculation tube connected at a first recirculation tube end with said first feed tube end and at a second recirculation tube end with the feed tube at a location upstream from said first feed tube one end;
   cut off apparatus operable to divide said substance into individual quantity portions, the cut off apparatus having a first position wherein said substance is recirculated at the stuffing pressure from said first feed tube end to said upstream location and no substance is being fed into said nozzle from said first feed tube end, said cut off apparatus having a second position wherein said substance is prevented from recirculation but is instead being fed into said nozzle from said first fee tube end;
   a magnetic/inductive flowmeter device connected with said cut off apparatus for metering the amount of said substance to be provided in each individual quantity portion through said nozzle, said flowmeter device causing said cut off apparatus to switch from said second position to said first position when each quantity portion has been achieved as sensed by said flowmeter device, and said flowmeter device being located in said feed tube between said first feed tube end and said upstream location so as to continuously sense the velocity of said substance.

5. A machine as set forth in claim 4 further comprising:
   a control device connected with said flowmeter device, said control device being adapted to generate a control signal from the velocity signal that corresponds with the travel integral, said control signal functioning to switch said cut off apparatus.

6. A machine as set forth in claim 4, said cut off apparatus comprising a reversing valve.

* * * * *

UNITED STATES PATENT AND TRADEMARK OFFICE
CERTIFICATE OF CORRECTION

PATENT NO. : 4,648,154

DATED : March 10, 1987

INVENTOR(S) : George H. Meinen

It is certified that error appears in the above-identified patent and that said Letters Patent is hereby corrected as shown below:

```
In the abstract:  At Line 17 after the word "quantity"
     the word should be "from" (not "form")

At Column 2, line 54, the word "path" should be --part--

In Claim 1, line 54, the word "said" should be --each--
```

Signed and Sealed this

Twenty-second Day of September, 1987

*Attest:*

DONALD J. QUIGG

*Attesting Officer*   *Commissioner of Patents and Trademarks*